(No Model.)
A. DAVY.
TRACK FOR HAY ELEVATORS.
No. 246,732. Patented Sept. 6, 1881.
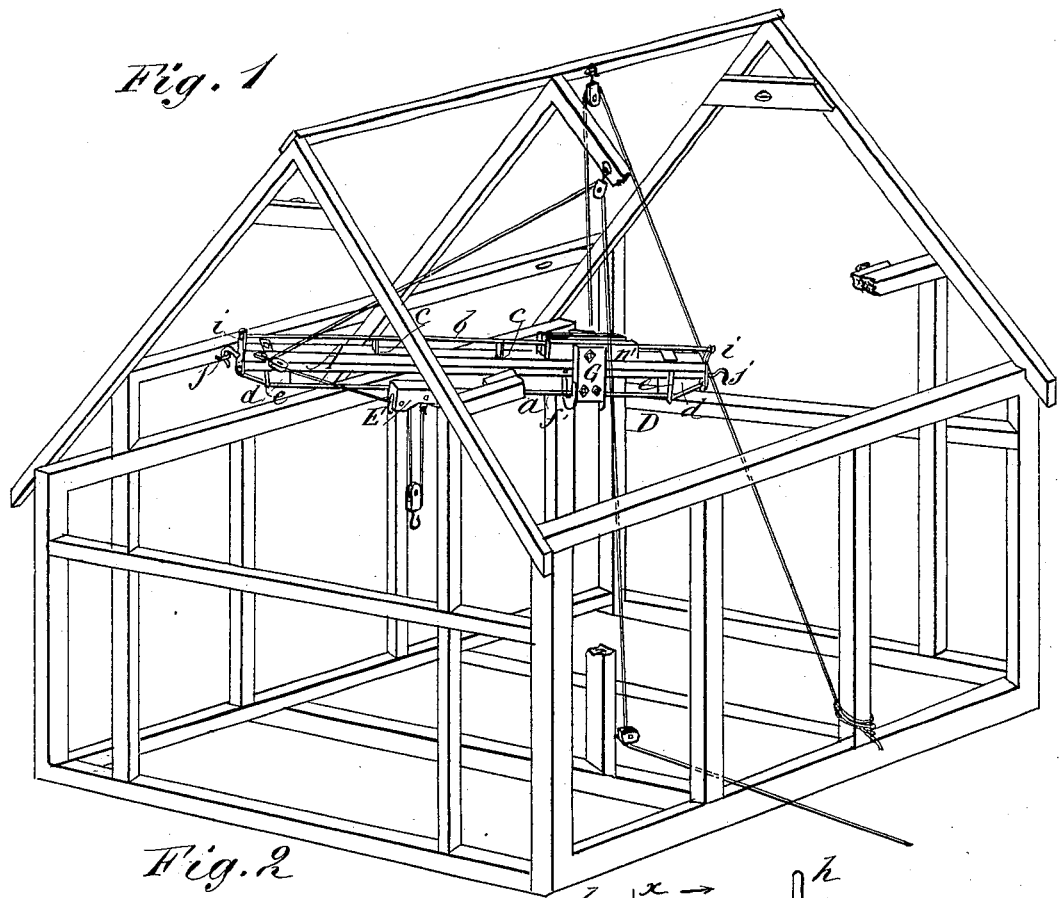
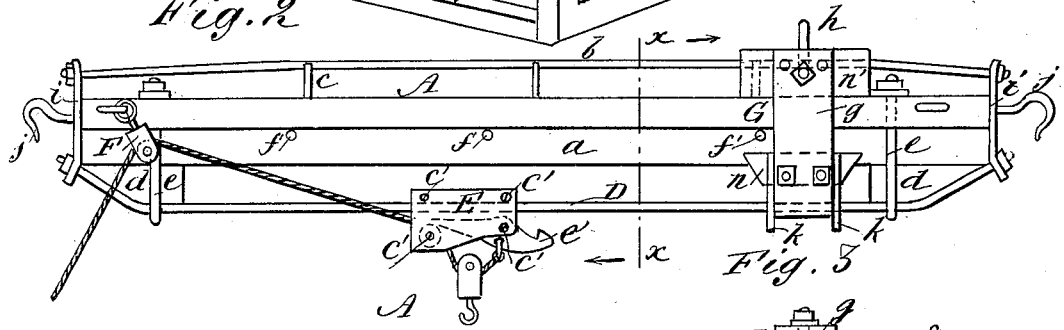
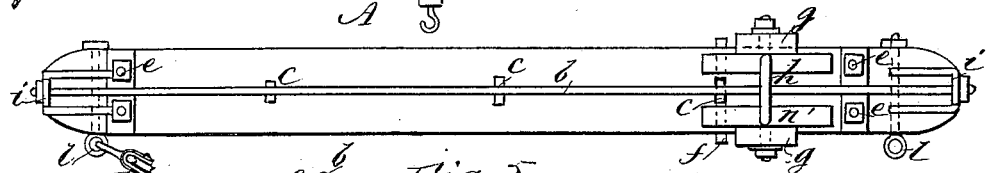
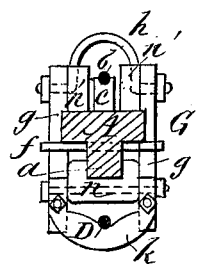
WITNESSES:
C. Neveux
C. Sedgwick
INVENTOR:
A. Davy
BY Munn & Co
ATTORNEYS.

United States Patent Office.

ALBERT DAVY, OF DANUBE, NEW YORK.

TRACK FOR HAY-ELEVATORS.

SPECIFICATION forming part of Letters Patent No. 246,732, dated September 6, 1881.

Application filed May 21, 1881. (No model.)

*To all whom it may concern:*

Be it known that I, ALBERT DAVY, of Danube, in the county of Herkimer and State of New York, have invented a new and useful Improvement in Tracks for Hay-Elevators, of which the following is a specification.

The invention consists, mainly, of a rod or track for the pulley-block of hay elevators or forks to run upon, supported by a suitable frame, which frame and rod may be easily shifted for depositing the hay or other material at any desired part of the building.

The invention further consists in providing the frame with a sliding head-block or yoke for supporting one end of the frame, and for prescribing the distance of travel of the pulley-block upon the track, and for rendering the frame reversible; and the invention also consists in the construction and combination of parts, as hereinafter fully described.

In the accompanying drawings, Figure 1 is a perspective view of my invention, showing the same in position for use. Fig. 2 is a side elevation of the track and supporting reversible frame. Fig. 3 is a plan view of the same. Fig. 4 is a cross-section taken on the line $x\ x$ of Fig. 2, looking toward the sliding head-block; and Fig. 5 is a similar section, looking toward the pulley-block, the parts being in position shown in Fig. 2.

Similar letters of reference indicate corresponding parts.

The main portion or beam A of the frame is preferably of wood, and formed with the reduced portion or rib $a$, extending along its under side. The bar A is braced by the tie-rod $b$, which is secured by nuts to the upper ends of the end plates, $i\ i$, and is supported by the bridges $c\ c$, which rest upon the top of the bar.

To the lower ends of the end plates, $i\ i$, are secured the ends of the rod D, which forms the track upon which the pulley-block E travels. The ends of this rod D are bent, as shown, and pass under the wedge-shaped blocks $d\ d$ at the ends of the beam A, which hold the rod a suitable distance below the bar for the free movement of the pulley-block; and the rod and the blocks are firmly secured to the beam A by the staples $e\ e$, which are furnished with screw-nuts on the upper side of the bar.

To the ends of the main beam A, and screwed in the end plates, $i\ i$, are hooks $j\ j$, by which either end of the frame is adapted to be attached to the plate or other timber of the building. The end of the bar which is not attached in this manner to the plate is adapted to be suspended by a rope attached to the staple $h$ in the top of the sliding head or yoke G, which rope passes over a pulley attached to the roof or rafters of the building.

The sliding yoke G is preferably formed of the side plates, $g\ g$, having the guttered shoe $n$ bolted between them at their lower ends. At the upper end of each bar is bolted the cross-pieces $n'\ n'$, which rest upon and are adapted to slide upon the upper side of the main frame, each side of the bridges supporting the tie-rod $b$. The staple $h$ rises over the tie-rod, and the ends thereof are bent outward and pass through the cross-pieces and the side plates and serve to tie the upper ends of said plates together. The guttered shoe $n$ fits upon and runs against the under side of the reduced portion $a$ for the main beam A, and serves as a guide for the yoke.

Upon each side of the plate $g\ g$, and at the lower ends thereof, are secured by bolts or screws the ends of the curved plates $k\ k$, which pass under and support the track or rod $b$, and these plates serve also to retain the catch $e'$ of the pulley-block E.

The yoke G is held in any desired place along the frame by means of the bolt or pin $f$, which passes through the holes $f'$, through the reduced portion $a$ of the bar A.

Near the ends and on the side of the bar A are placed the eyes $l\ l$, in which the stationary pulley F, for the rope which raises and lowers the load, is attached.

The face-plate of pulley-block E is removable by means of the screws $c'\ c'$, and can thus be taken off the rod $b$ and reversed when desired, so that when the track and frame are to be shifted from one side of the building to the other all that is necessary to be done is to remove the pulley-block E, withdraw the pin $f$, unhook the end of the frame from the plate, and slide the frame through the yoke, and hook the opposite end at the point desired on the plate or other part of the building, and then replace the pulley-blocks and transfer the pulley F to the opposite end of the frame.

By this construction it will be observed that in filling the barn the yoke can be located upon the bar A, so as to carry the material at any point desired; and in taking out hay or ensilage it is particularly advantageous, as the yoke can be locked immediately over the different sections to be taken out. Besides, the free end of the frame can be raised or lowered by the rope which suspends it so as to incline the track in either direction.

Having thus fully described my invention, I claim as new and desire to secure by Letters Patent—

1. The track-rod of a hay fork or elevator, secured in a frame, in combination with a removable pulley-block, the frame being adapted to be reversed, end for end, substantially as and for the purpose described.

2. In combination with the track or rod D and the reversible frame, the sliding yoke G, substantially as and for the purposes specified.

3. The frame and rod or track adapted to be suspended at one end, in combination with the sliding removable pulley-block E and the movable yoke G, substantially as and for the purposes specified.

4. The sliding yoke G, provided with the curved plates $k\ k$ and the cross-pieces $n'\ n'$ and shoe $n$, in combination with the frame and rod D, substantially as and for the purposes set forth.

5. The sliding pulley-block formed with the hook $e'$, in combination with the sliding yoke G, provided with the plates $k\ k$, as and for the purposes set forth.

6. The beam A, formed with the reduced portion $a$ and braced with the tie-rod $b$, in combination with the track or rod D, held below the frame by means of the wedge-shaped block $d\ d$, substantially as specified.

ALBERT DAVY.

Witnesses:
ALBERT STORY,
C. O. VAN ALSTINE.